Patented Dec. 1, 1953

2,661,368

UNITED STATES PATENT OFFICE

2,661,368

PREPARATION OF DISUBSTITUTED PROPARGYL ACETOACETATES AND DECARBOXYLATION OF SAME

Walter Kimel, Highland Park, N. J., and Norbert William Sax, Brooklyn, N. Y., assignors to Hoffmann-La Roche Inc., Nutley, N. J., a corporation of New Jersey No Drawing. Application May 15, 1952, Serial No. 288,054

12 Claims. (Cl. 260—483)

This invention relates to novel processes for preparing unsaturated ketones and to novel intermediates for use in said processes, as well as to the separate steps of said processes and to all products obtained by said processes. More particularly, one aspect of the invention relates to a method of making substituted alkadienones by eliminating carbon dioxide from a disubstituted propargyl acetoacetate of a specified class. Another aspect of the invention relates to the preparation of said disubstituted propargyl acetoacetates by condensing diketene with a disubstituted propargyl alcohol of a specified class.

A comprehensive embodiment of the invention is illustrated by a process which comprises condensing diketene with a disubstituted propargyl alcohol wherein each substituent is a hydrocarbon radical attached to the 1-carbon atom of the propargyl radical and eliminating carbon dioxide from the condensation product. Such a process can be represented graphically by the following equations:

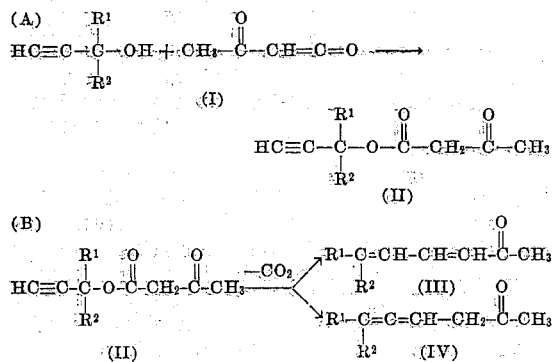

In the equations, $R^1$ and $R^2$ can be identical or different substituents, and each of $R^1$ and $R^2$ represents a hydrocarbon radical, and especially an acyclic hydrocarbon radical. It will be observed that $R^1$ and $R^2$ are each attached to the 1-carbon atom of the propargyl radical. A particular embodiment of the invention is the case in which $R^1$ and $R^2$ each represents the same or different acyclic hydrocarbon radicals attached to the 1-carbon atom of the propargyl radical through an unsubstituted methylene group. A preferred form of the latter embodiment is the case in which $R^1$ represents a lower alkyl radical (with particular preference for a methyl radical) attached through an unsubstituted methylene group to the 1-carbon atom of the propargyl radical, and $R^2$ represents an unsaturated acyclic hydrocarbon radical (with particular preference for a lower alkenyl radical) attached through an unsubstituted methylene group to the 1-carbon atom of the propargyl radical. Illustrative embodiments of such a preferred form of the invention are described in Examples 2 and 3 below.

The substituted alkadienone (III) is ordinarily obtained as the major component of the reaction product. The product (III) as well as the isomeric alkadienone product (IV), can be obtained in a state of substantial purity by appropriate treatment of the final reaction mixture, e. g. by fractional distillation under reduced pressure. The intermediate condensation product (II) can similarly be obtained in substantially pure condition, e. g. by fractional distillation in high vacuo. However, it need not be isolated, but can be used even in the form of a crude reaction product for the subsequent step of decarboxylation (Equation B).

Certain of the disubstituted propargyl alcohols used as starting materials can exist in optically active and racemic forms, and the invention is applicable to all of such forms. Accordingly, the invention comprehends also the racemic and optically active forms of the condensation product (II), as well as the stereoisomeric (e. g. geometrically isomeric) forms of each of the products (III) and (IV).

Among the substituted alkadienones which can be prepared by processes disclosed herein are pseudoionone and pseudoirone, and the invention is therefore particularly useful in the pharmaceutical and perfume industries.

The invention is further disclosed in the following examples, which are illustrative but not limitative thereof.

Example 1

In a one-liter 3-neck flask equipped with a stirrer, dropping funnel, thermometer and drying tube, 0.3 g. of sodium was allowed to react with 118 g. (1.4 mols) of 1,1-dimethyl-propargyl alcohol. When reaction was complete, the solution was cooled to +5° C., and 141 g. (1.68 mols) of diketene was added, dropwise, over a period of 5 hours, so that the reaction temperature did not exceed +10° C. Stirring was continued at that temperature for an additional 24 hours. Then, 150 cc. of toluene was added, and the solution was extracted 4 times with 150 cc. portions of 5% sodium carbonate solution, followed by water washing until neutral. The toluene was removed from the extracted and washed solution by distillation in vacuo, and the residue was purified by further vacuum distillation. The fraction boiling at 80°—84° C. (7 mm.) was 1,1-dimethylpropargyl acetoacetate. After standing for a short time, it solidified to a white solid, melting at about 60° C.

In a one-liter 3-neck flask equipped with a stirrer and thermometer, and connected to a gas meter through a reflux condenser, was placed 185 g. (1.1 mols) of 1,1-dimethyl-propargyl acetoacetate. The flask was heated in an oil-bath to 160°–180° C., whereupon vigorous evolution of carbon dioxide occurred. When gas evolution had ceased (about 3 hours), heating was discontinued, and the residual dark-brown liquid was fractionally distilled in vacuo. Two fractions were isolated, i. e. a smaller fraction containing essentially 6-methyl-heptadien-4,5-one-2, boiling at 62.5–66° C. (7.5 mm.), and a larger fraction, containing essentially 6-methyl-heptadien-3,5-one-2, boiling at 73–76° C. (6.5 mm.).

Each fraction, on absorption of one mol of hydrogen (at room temperature under slight superatmospheric pressure and using a poisoned Pd-CaCO₃ catalyst) yielded 6-methylhepten-5-one-2; further identified, in each case, by the semi-carbazone, M. P. 135–136° C., unchanged on mixture with an authentic sample.

Example 2

In a one-liter, 3-neck flask equipped with a mechanical stirrer, thermometer, dropping funnel and drying tube, 0.3 g. of sodium was allowed to react with 152.2 g. (1.0 mol) of racemic 1-methyl-1-(4-methyl-penten-3-yl)-propargyl alcohol. The resulting solution was cooled to 0° C., and 109.1 g. (1.3 mols) of diketene was added, dropwise, with efficient stirring, over a period of 5 hours. Stirring was continued for an additional 40 hours at 0° C., and then at 25° C. for 3 hours.

Finally, the solution was diluted with 200 cc. of ether, and washed six times with 200 cc. portions of saturated sodium bicarbonate solution, and then with water until neutral. The ether layer was dried over calcium sulfate, the solvent removed by distillation, and the product purified by distillation under high vacuum. The product, racemic 1-methyl-1-(4-methyl-penten-3-yl)-propargyl acetoacetate, was obtained as a colorless liquid; B. P. 43°–46° C. (0.007 mm.); $n_D^{25}=1.4652$; $d_4^{25}=0.9785$.

In a one-liter, 3-neck flask equipped with a mechanical stirrer, capillary tube, thermometer and reflux condenser was placed 236.2 g. (1 mol) of racemic 1-methyl-1-(4-methyl-penten-3-yl)-propargyl acetoacetate. A fine stream of nitrogen was passed through the capillary tube, and the flask was heated in a bath at 150°–200° C. Evolution of carbon dioxide commenced at about 150° C., and became quite vigorous at 180° C. The reaction mixture was then maintained at 180°–200° C. for 90 minutes, i. e. until the evolution of carbon dioxide had ceased.

The flask was allowed to cool to room temperature, and the contents were dissolved in 250 cc. of low-boiling petroleum ether. The solution was extracted three times with 200 cc. portions of saturated sodium bicarbonate solution, and then was washed with water until neutral. After drying the extracted and washed solution over calcium sulfate, and removing the solvent by distillation, the residue was purified by distillation through a fractionation column. The main product was 6,10-dimethyl-undecatrien-3,5,9-one-2 (pseudoionone), B. P. 90°–92° C. (0.5 mm.); $n_D^{25}=1.5290$. Its semicarbazone had M. P. 141°–143° C., unchanged on mixture with an authentic sample. By-products were citral and the allenic isomer of pseudoionone, i. e. 6,10-dimethyl-undecatrien-4,5,9-one-2.

Example 3

In a one-liter, 3-neck flask equipped with a stirrer, thermometer, dropping funnel and drying tube, 0.3 gram of sodium was allowed to react with 166 g. (1 mol) of racemic 1-methyl-1-(3,4-dimethyl-penten-3-yl)-propargyl alcohol. The resulting solution was cooled to +5° C., and 100.8 g. (1.2 moles) of diketene was added, dropwise, at +5° to +10° C., over a period of 5 hours. Stirring was continued for 24 hours at +10° C. Then, 160 cc. of toluene was added, and the solution was extracted 5 times with 150 cc. portions of saturated sodium bicarbonate solution, followed by water until neutral. The toluene was removed in vacuo, leaving a fraction containing racemic 1-methyl-1-(3,4-dimethyl-penten-3-yl)-propargyl acetoacetate; $n_D^{25}=1.4717$.

In a one-liter, 3-neck flask equipped with a stirrer and thermometer, and connected to a gas meter through a reflux condenser, was placed 250 g. (1 mol) of the above acetoacetate having $n_D^{25}=1.4717$. The flask was heated in an oil bath at 120°–170° C. Evolution of carbon dioxide commenced at 120° C. and was vigorous at 150°–160° C. After gas evoluton had ceased (3 hours), the product was purified by distillation. There was obtained as a main product, 6,9,10-trimethyl-undecatrien-3,5,9-one-2 (pseudoirone); B. P. 98°–102° C. (0.1 mm.); $n_D^{25}=1.5310$, along with a non-distillable residue, and a lower boiling fraction consisting, in part, of the allenic compound isomeric with pseudoirone, i. e. 6,9,10-trimethyl-undecatrien-4,5,9-one-2.

This application is a continuation-in-part of our copending application Serial No. 276,706, filed March 14, 1952.

We claim:

1. A method which comprises condensing diketene with a disubstituted propargyl alcohol wherein each substituent is a hydrocarbon radical selected from the group consisting of lower alkyl and lower alkenyl radicals and is attached to the 1-carbon atom of the propargyl radical and eliminating carbon dioxide from the condensation product.

2. A method which comprises condensing diketene with a disubstituted propargyl alcohol wherein each substituent is a hydrocarbon radical selected from the group consisting of lower alkyl and lower alkenyl radicals and is attached to the 1-carbon atom of the propargyl radical.

3. A method which comprises heating a disubstituted propargyl acetoacetate wherein each substitute is a hydrocarbon radical selected from the group consisting of lower alkyl and lower alkenyl radicals and is attached to the 1-carbon atom of the propargyl radical, to eliminate carbon dioxide from said disubstituted propargyl acetoacetate.

4. A method according to claim 3 wherein 1-methyl-1-(4-methyl-penten-3-yl)-propargyl acetoacetate is heated.

5. A method according to claim 3 wherein 1-methyl-1-(3,4-dimethyl-penten-3-yl)-propargyl acetoacetate is heated.

6. Disubstituted propargyl acetoacetate wherein each substituent is a hydrocarbon radical selected from the group consisting of lower alkyl and lower alkenyl radicals and is attached to the 1-carbon atom of the propargyl radical.

7. A compound according to claim 6 wherein each hydrocarbon radical is attached through an unsubstituted methylene group.

8. Disubstituted propargyl acetoacetate wherein the two substituents are respectively a methyl group attached to the 1-carbon atom of the propargyl radical and a lower alkenyl radical attached through an unsubstituted methylene group to the 1-carbon atom of the propargyl radical.

9. 1 - methyl - 1 - (4 - methyl-penten - 3 - yl) - propargyl acetoacetate.

10. 1 - methyl - 1 - (3,4 - dimethyl - penten - 3- yl) -propargyl acetoacetate.

11. A method which comprises condensing diketene with 1-methyl-1-(4-methyl-penten-3-yl)-propargyl alcohol.

12. A method which comprises condensing diketene with 1-methyl-1-(3,4-dimethyl-penten-3-yl)-propargyl alcohol.

WALTER KIMEL.
NORBERT WILLIAM SAX.

References Cited in the file of this patent

Acetylenic Compounds, Johnson, vol. 1, Edward Arnold, London (1946) page 140.

Chemical Abstracts 38:66 (1944).